ced and is secured by

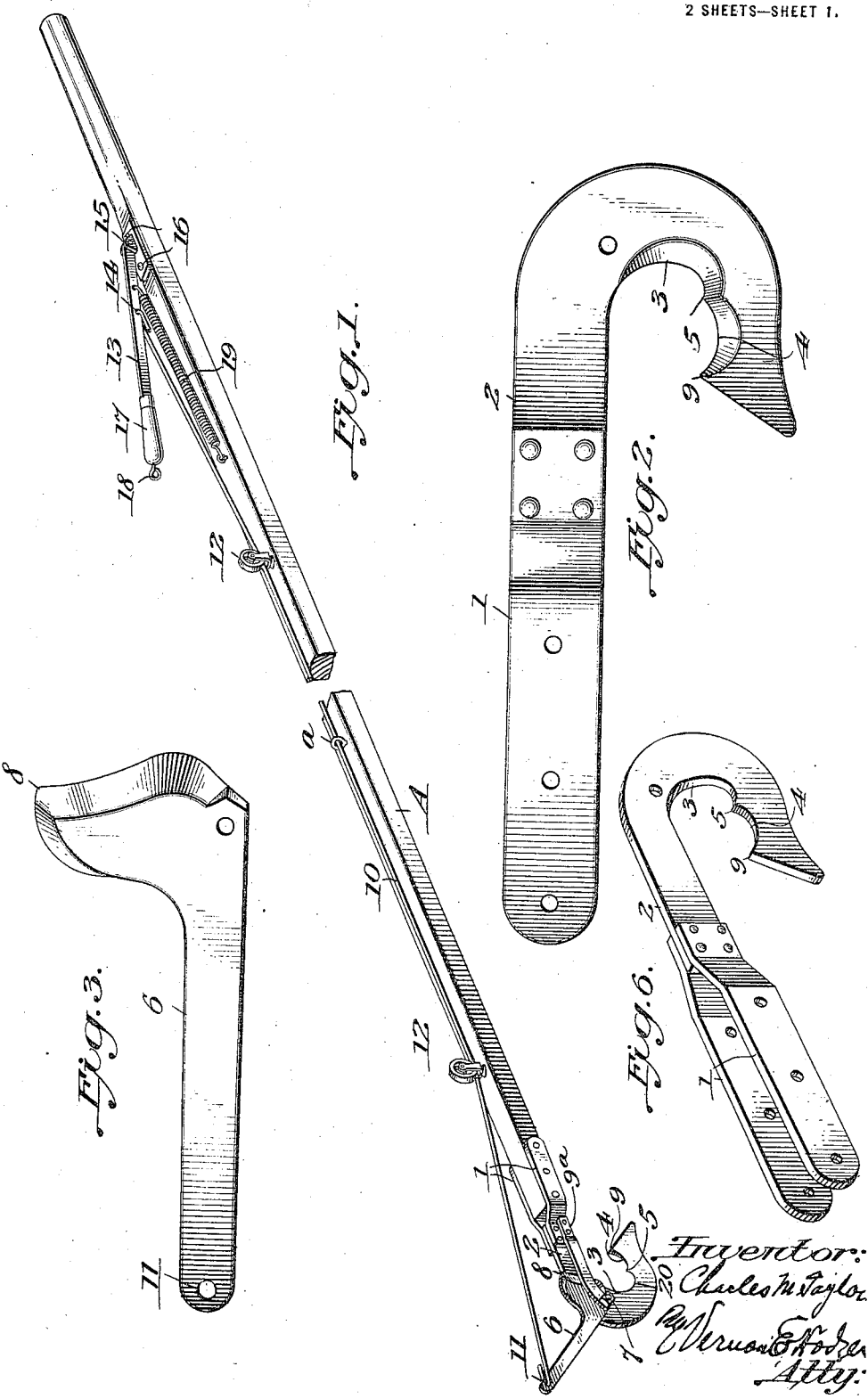

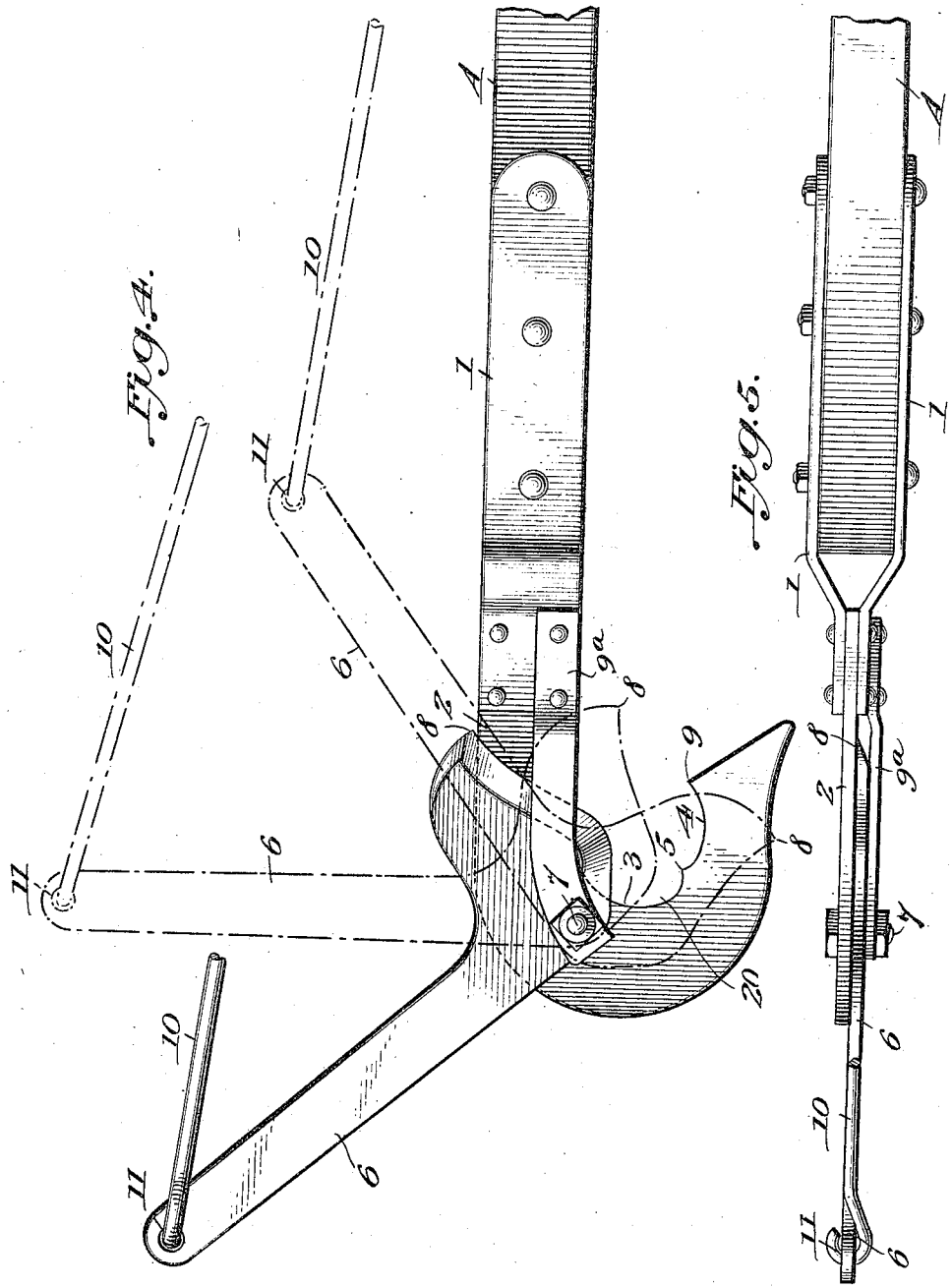

UNITED STATES PATENT OFFICE.

CHARLES M. TAYLOR, OF PARIS, KENTUCKY.

TREE-TRIMMER.

1,237,581.  Specification of Letters Patent.  Patented Aug. 21, 1917.

Application filed November 6, 1915. Serial No. 60,026.

*To all whom it may concern:*

Be it known that CHARLES M. TAYLOR, citizen of the United States, residing at Paris, in the county of Bourbon and State of Kentucky, have invented certain new and useful Improvements in Tree-Trimmers, of which the following is a specification.

My invention relates to tree trimmers, and the object is to make provision for the initial cut above a horizontal axis so that gravity will assist in the cutting of the limb.

Another object is to provide lateral support for the knife whereby to insure proper shearing contact of the blades in cutting.

My invention consists in a combination blade and power lever which has on its front end a reversely curved cutting edge in the form of a compound curve, in connection with a hook shaped frame head, the sharp operating edge of which is upon two curves, namely; a simple and a spiral curve, in the latter of which the limb is adapted to enter freely and there rest for the initial cut. The juncture of these two curves is in the form of a projection which serves as a support to the limb, and is for the purpose of holding the limb against the operating blade, the simple curve being utilized to hold the last bark and fibers of wood in a position from splitting when the cutting edge of the combination blade and power lever closes the gap across the hook shaped head, thereby preventing the limb from splitting or the bark on the trunk from being torn, and to insure a smooth severing at the simple curve formation where there is a final shearing.

In the accompanying drawings,

Figure 1 is a view of the improved tree trimmer in perspective.

Figs. 2 and 3 are enlarged views of the hook shaped frame head, and the combination blade respectively.

Fig. 4 is an enlarged view showing it in the operative positions in full and dotted lines, the dotted line indicating the different positions assumed during the cutting of a limb.

Fig. 5 is an enlarged view from the edge showing the frame head.

A, represents a reaching pole, the four square corners of which constitute ribs which stiffen and hold the pole more rigid against the strain incident to cutting a limb.

On the upper end of the reaching pole the frame head 1, is bolted (see Fig. 5.) This frame head is hook shaped and is secured by bolts or rivets to the pole. The inner edge of the hook shaped head 1, is sharpened and is in the form of two different curves, namely: a spiral curve 3, and a simple curve 4, which come together at a point 5, the functions of which curves will be explained in connection with the combination blade and power lever 6, which is L-shaped and connected to the hook shaped head 1, at the upper curvature of the latter, by means of a pin or rivet 7, the cutting edge of which is in the form of a compound curve starting at one corner adjacent to which the combination blade and power lever is pivoted, then extending outwardly, then inwardly, and finally outwardly at the angle 8 most remote from the pivot 7, and which end coöperates with the end 9 of the hook shaped blade. A guide plate 9ª is secured to the frame head 1, and by affording lateral support to the blade 6, between which and the hook shaped head 1, it fits and turns, insures a straight cut through the limb.

An operating rod 10 is connected at one end to the outer end of the combination blade or power lever 6, as at 11 passing beneath the anti-friction rollers, 12, 12, of which there may be two or more, the intermediately placed screw-eye *a* to the lower power lever 13, as shown at 14, which lever is fulcrumed at one end to the seat 15, secured on the reaching pole by screws or other means 16.

The lever 13 has a handle 17 on its upper end and a screw-eye 18 in its end is provided to receive an operating rope when an extension is used. A coil spring 19 extends from the hand lever 13 to the reaching pole and is for operating the combination blade and power lever to return it and the handle to normal position, as shown in full lines, when released ready to operate upon a limb to be cut.

When in this position the hook shaped head is placed so that the limb to be cut is initially received in the spiral curvature 3. The projection 5 between the simple and spiral curves serves as a support to the limb, for the purpose of holding the limb against the cutting edge of the operating blade and power lever at a point nearest to the fulcrum or pivot 7. While thus held the handle lever 13 is pulled down and the initial cut takes place between the spiral curve formation 3 and the outward curvature or convex surface of the cutting edge of the combination blade and power lever 6, having the effect of a shearing and revolving movement across the fibers of wood, cutting the limb from the top side, thus getting the aid of gravity in the severing of the limb.

I am doubly assisted in this cut by this driving and revolving movement produced by the operating blade and juncture of the curvatures 3 and 4 at 5 of the hook shaped head, having the effect of holding the limb rigidly against the cutting edge of the blade; and the curvature 4 serves to hold the last bark and fibers of wood in a position from splitting when the points 8 and 9 of the combination blade and power lever and hook shaped head come together closing the gap at 20, thus not allowing the limb or trunk to split or break, and insuring a smooth severing at curvature 4, the inward curvature toward the end 8 of blade 6 concluding the cut with a shearing action.

I claim:

1. A tree-trimmer comprising a hook which opens downwardly, whereby to engage the limb to be trimmed from the top, the inner edge of the hook formed upon two successive curves, and a blade, the cutting edge of which is in the form of a compound curve, the blade being pivoted at a point adjacent to one end of the compound curve, at a point on the hook remote and opposite from the point of juncture between the two curves upon the inner surface of the hook, so that the first cut applied to the limb to be severed is between the inside curve of the hook and the convex portion of the compound curve of the cutting blade, and the final cut is between the outer curve of the hook and the concave portion of the compound curve of the cutting blade.

2. A tree-trimmer comprising a handle, a hook which opens in a direction toward the handle, and a cutting blade pivoted to the hook, the operative inner edge of the hook in the form of two curvatures, the ends of which come together at a point, the cutting edge of the cutting blade in the form of a compound curve, the convex portion of which is normally above and at one side of the curvatures of the hook, and in position to coöperate with one curvature thereof to initiate the cutting, and the concave portion of the cutting edge coöperating with the other curvature of the hook to sever the final fibers of the limb to be cut which might escape the convex portion of the cutting-blade, and hence not be cut thereby.

3. A tree trimmer comprising a hook, the inner edge of which is in the form of two successive curves, one a spiral and the other a simple curve, one of which curves at least is sharpened, whereby to cut the bark on the upper surface of a limb when the trimmer is hooked over the limb to be cut, and a blade which has a reversely curved cutting edge, said blade being pivoted to the hook, one portion of the curve of said cutting blade coöperating with the spiral curve of the hook, and the other portion of the cutting blade with the simple curve of the hook.

4. A tree trimmer comprising a hook-shaped head, a combination blade and power lever of L-shaped form pivoted at or near its angle to the upper part of the hook-shaped head, the cutting edge of the latter having two curves, one a spiral curve and the other a simple curve, the cutting edge of the combination blade and power lever in the form of a compound curve, a part of which coöperates with the spiral curve of the hook-shaped head and the other part with the simple curve of said hook-shaped head.

5. A tree trimmer comprising a hook shaped head, a combination blade and power lever of L-shaped form pivoted at or near its angle to the upper part of the hook shaped head, the cutting edge of the latter having two curves, one a spiral curve and the other a simple curve, the cutting edge of the combination blade and power lever in the form of a compound curve, a part of which coöperates with the spiral curve of the hook shaped head, the other part with the simple curve of said hook shaped head, and a guide plate secured to the frame head, between which and the hook shaped head, the combination blade and power lever fits and turns, it being thereby laterally supported on both sides insuring a straight cut through the limb.

6. A tree trimmer comprising a hook shaped head, a combination blade and power lever of L-shaped form pivoted at or near its angle to the upper part of the hook shaped head, the cutting edge of the latter having two curves, one a spiral curve and the other a simple curve, the cutting edge of the combination blade and power lever in the form of a compound curve, a part of which coöperates with the spiral curve of the hook shaped head, and the other part with the simple curve of said hook shaped head, a reaching pole to which the hook shaped head is secured, a lower spring actuated power lever fulcrumed at one end to the reaching pole, an operating rod extending from one power lever to the other, and antifriction rollers supported upon the reaching pole, beneath and in contact with which the operating rod extends.

In testimony whereof I affix my signature.

CHARLES M. TAYLOR.